Patented June 9, 1931

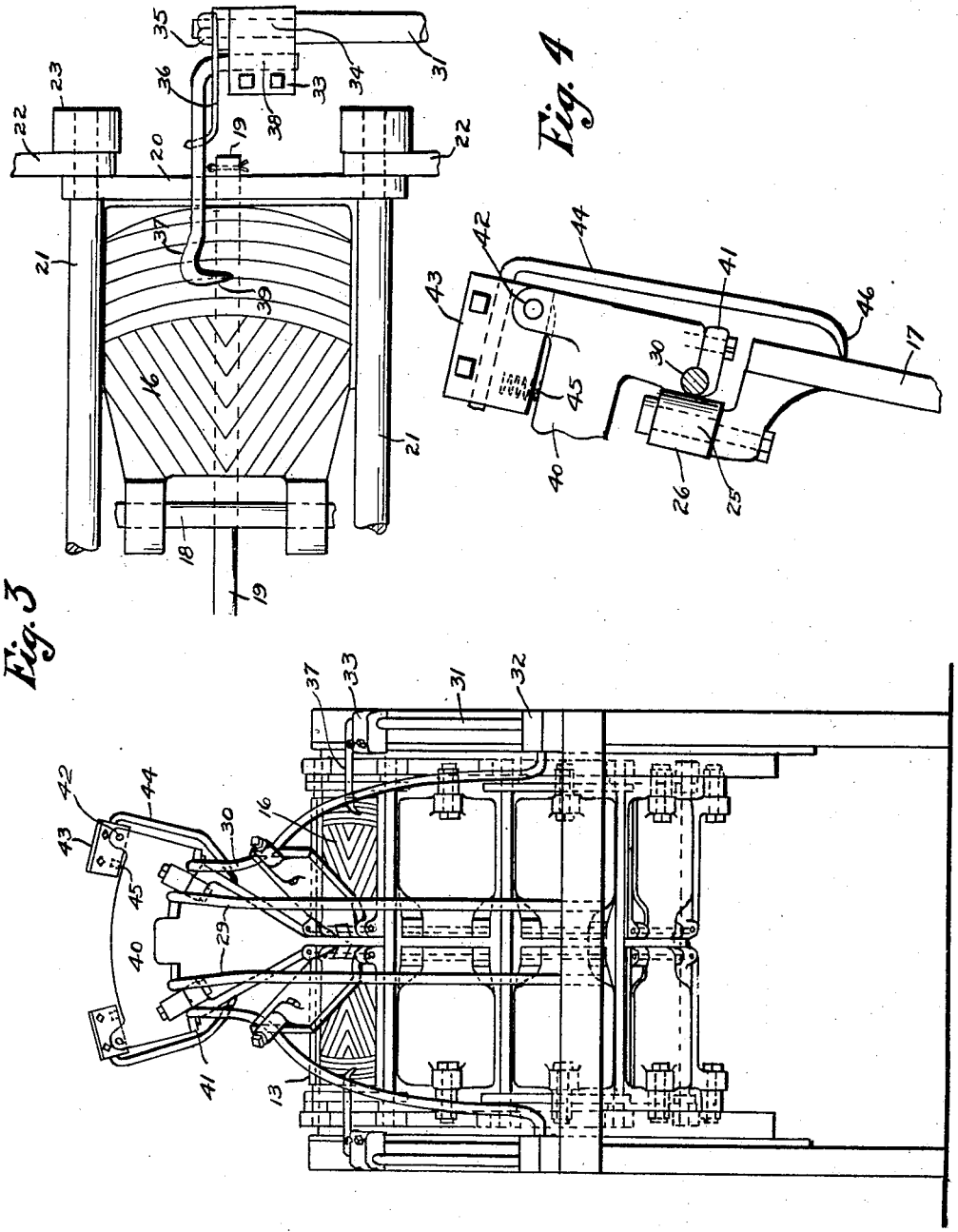

1,808,997

UNITED STATES PATENT OFFICE

CHARLES SCHROEDER AND HARRY TATOSIAN, OF BRIDGEPORT, CONNECTICUT, ASSIGNORS TO ICE CREAM CONE MACHINERY INC., OF BRIDGEPORT, CONNECTICUT, A CORPORATION OF CONNECTICUT

STRIPPER FOR PASTRY CAKE BAKING MACHINES

Application filed January 4, 1928. Serial No. 244,447.

Our invention relates to ice cream cone machines and particularly to machines for baking pastry cakes from which the so-called, sugar ice cream cones, are rolled, while yet warm and pliable. The invention is applicable to all styles of pastry come cake baking machines with which we are familiar and would require but slight change in the construction of its attaching means for different makes of machines.

The invention as illustrated herein is shown applied to a commercial type of machine of our own make and similar in most all essential features to that shown in our prior Patent No. 1,540,041 dated June 2, 1925. It is to be understood however that the application of this particular type of machine, herein shown, is purely for illustrative purposes and in order to convey a proper understanding of the merits of the invention.

The machine referred to is what is commonly known in the trade as a double chain type of cone cake baking machine and includes two endless chains of baking irons, each comprising approximately fifty baking units or pairs of irons and each chain being provided with complete sets of necessary associated mechanisms such as batter feeding devices, baking ovens, baking iron opening and closing mechanisms. The two said sets of mechanisms however are supported upon a common frame and are operated from a common motor or power shaft and when operated at its running capacity, will produce from the two units, about 4800 cakes per hour. This machine requires three attendants, one for preparing the batter and keeping the batter feeding reservoir filled, and one for each of the two chains of baking irons for picking the baked cakes therefrom, when the irons separate.

The work of removing the cakes from the machine when operating at the speed above suggested, keeps the attendants very busy, the work being mostly done in the summertime, and in a close room and over a hot gas heated machine.

The baked cakes as they come forward, adhere to one or the other of the pairs of irons, sometimes to the lower iron and more often to the upper, which necessitates the loosening of the cake from which it sticks, by an instrument in the hand of an attendant, who quickly takes hold of the edge of the loosened cake, pulls it off and places it in a rolling machine, located nearby.

It is therefore with a view of relieving the attendants of some of this work, thereby permitting the speeding up of the machine and increasing its output, that we have devised the present improvement, which briefly speaking comprises what we have termed, a stripper for partly loosening the baked cakes from the irons so that they may be quickly removed by the attendants and whereby the attendants will be relieved from the operation of loosening the cakes and be free to use both hands for conveying the cakes from the iron to the rolling machine.

The object therefore of the present invention is to provide a stripping device for any of the cone cake baking machines and whereby the baked cakes may be loosened or freed from the moving baking irons, so as to enable the attendants to quickly grasp and remove the same.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit or sacrificing any of the advantages of the invention.

Similar characters of reference denote like or corresponding parts throughout the several figures of the accompanying drawings forming a part of this specification and upon which Fig. 1 shows a side elevation of one end portion of our chain type of baking machine before referred to, and to which our improved cone cake strippers are shown applied;

Fig. 2 shows a front end view of the machine illustrated in Fig. 1, with stripping devices shown applied to the two sections or chains of baking units;

Fig. 3 is an enlarged plan view of one of the inner or bottom movable baking irons, shown in lower right of Fig. 2; and Fig. 4 is an enlarged front view of one of the outer or upper movable baking irons shown in upper right of Fig. 2.

Figure 1:
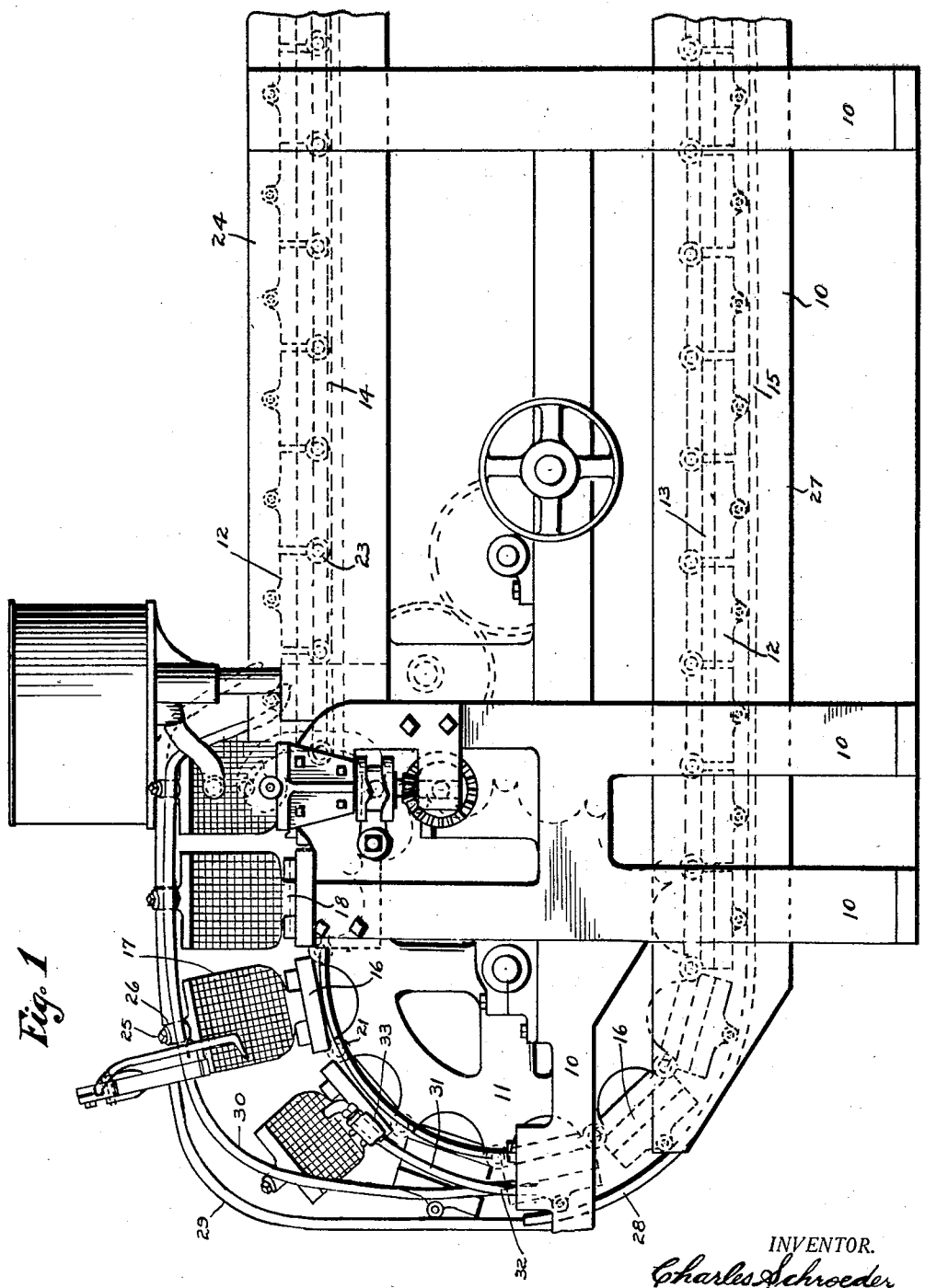

We will first briefly describe the chain type of baking machine before referred to and to which our novel strippers are shown applied. In this connection, but two views of the machine have been furnished which are in our judgment, sufficient for a proper showing of the application of the invention.

Referring in detail to the characters of reference marked upon the drawings, 10 represents the frame members of a cone cake baking machine and 11 a large double form of sprocket wheel mounted in one end portion of the frame, and which may be operated in any suitable manner, not shown. Two chains of baking units 12 and 13 are mounted upon the sprockets shown for supporting the same, there being a similar sprocket in the other end of the machine, not shown, which together with tracks 14 and 15, serve to support and guide the chain during its travel through the machine. The two chains are substantially alike in construction as are also the associated novel stripping mechanisms to be further described. The two chains are similarly constructed, being formed of a series of baking units linked together and supported on the sprockets and tracks before referred to.

Each baking unit comprises an inner baking iron 16 and an outer baking iron 17, the two being hingedly connected by a pivotal pin 18 so that the outer or upper plate is free to be raised and lowered from and upon the lower plate, as will again be described. The inner baking iron is supported upon a cross rod 19 whose end portions are connected to links 20, having holes in its end portions, into which cross rods 21 are placed and upon which ends are also connected additional links 22 and rolls 23.

These rolls serve to ride upon the track 14 before mentioned to insure the free travel and proper guidance of the chain of baking irons through upper baking area 24 of the machine, during the baking of the cakes. The upper baking iron is provided upon its outer end portion with a stud 25 which carries a roll 26 that engages and rides upon the lower track 15 as the chain of baking units travel forward through the lower baking area 27. The forward end of this track 15 is curved upward as at 28 and serves to support the closed baking units in an inverted position, from that occupied during their rearward travel through the upper part of the machine, and retains the outer plate in a closed position until it gets about half way up from its lower area of travel to its upper line of travel. At this point in the machine we provide a pair of guide rods 29 and 30, the end portions of which are suitably attached to the machine. These rods are of proper formation and suitably spaced apart to form guides or cams upon and between which the rolls of the outer baking plates ride in a way to lift the free end portion of said plates from the lower ones, leaving the baked cake exposed therebetween. These cakes at this point in the operations adhere to one iron or the other and require to be loosened preparatory to removal, which operations are now performed by hand.

It is therefore the purpose of our invention, as before suggested, to provide automatic, mechanical means to strip and loosen the cakes from both sets of baking irons, preparatory to removal.

We have, therefore, provided the following described automatic, mechanical means to strip and loosen the cakes from both sets of baking irons, preparatory to removal. In the drawings we have illustrated comparatively simple and inexpensive forms of strippers for the baking machine which in practise work very well on the type of machine to which they are shown attached, though for a different style of machine it may need to be modified slightly to obtain equally as good results. We do not wish, therefore, to be confined to the particular form of stripper shown, since so far as we know we are the first to provide a stripping device of any sort for a cone cake baking machine.

The stripper for the inner and outer line of plates for this machine differs but slightly, due to the different positions the baking irons assume and the different parts of the machine to which the strippers are attached. One stripper being supported to operate on the outer line of plates and the other on the inner line of plates. Briefly speaking these strippers each comprise a spring actuated flexibly supported finger, which may be made of heavy wire and includes an inwardly turned sharpened end portion that engages the surface of the baking irons, as they move forward, beneath an edge portion of the cakes in a manner to free them from the irons.

Referring more particularly to the stripper for the inner or lower iron as shown in Fig. 1, it will be seen that the said stripper is supported upon a curved rod 31 that in turn is fixed to the frame of the machine at 32 and carries an attached head 33 which is secured to the reduced threaded end portion 34 of the rod by a nut 35. This nut also serves to clamp and support one end portion of a spring 36 whose outer free end portion engages the finger 37 before mentioned.

The shank portion 38 of this finger is secured and supported in a socket of the head as will be readily understood from Fig. 3. The hook-like pointed end 39 of the finger is disposed forward in the direction of the oncoming baking irons and is supported so as to properly engage the inner face thereof and slide along across the same so as to move in under the edge of the cake and free it from the iron. The spring referred to provides for any slight yield which may be necessary to better adjust itself to the delicate travel across the iron as suggested.

The strippers for the two lines of outer irons are mounted on a yoke 40 which in turn is secured to guide rods 29 and 30 by clamping plates 41. This yoke thus serves to support the two upper picks for the two outer lines of baking irons and is provided with an ear 42 upon each of its upper outer corners for the pivotal connection of movable heads 43 in which the picker fingers 44 are carried. A spring 45 is seated in a pocket of each head and against the yoke 40 before mentioned. These picker fingers are also provided with a pointed bent end portion 46 for engagement with the underface of the outer iron as the same moves along across the fingers. The spring 45 herein provided permits of a yielding engagement of the pointed end of the finger with the plate in a manner to gently pass in under the cake.

Inward movement of point 49 of the upper picker, that is picker 44, is limited by the shoulder adjacent to pivot 42, see Figs. 2 and 4. The lower picker point 39 is engaged by the rolls 23 as the irons move forward and said picker is raised thereby, just enough to insure its engagement with the face of the irons. Also, the curve in the guide rails 30 serves to swing the edge of the irons free of the points of the fingers.

Having thus described our invention, what we claim and desire to secure by Letters Patent is:

1. The combination with a cone cake baking machine including a series of hingedly connected pairs of baking irons, means for moving the same in a horizontal plane, means for raising one iron of each pair from the other of said pair, of a cake picking device in the line of travel of each of the pair of baking irons while open, said picking device comprising a finger to engage and traverse the face of each of said irons as they move forward past the picker.

2. In a cone cake baking machine, the combination of a series of hinged travelling baking irons, means for raising said irons at a predetermined location, a yieldable finger disposed beneath and adapted to engage the under face of each of the said irons when raised in a manner to partly free a cake therefrom.

Signed at Bridgeport in the county of Fairfield and State of Connecticut this 30th day of Dec. A. D. 1927.

CHARLES SCHROEDER.
HARRY TATOSIAN.